United States Patent
Aiyama

(10) Patent No.: US 8,424,793 B2
(45) Date of Patent: Apr. 23, 2013

(54) FILAMENT WINDING DEVICE AND FILAMENT WINDING METHOD

(75) Inventor: Takenori Aiyama, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 13/266,566

(22) PCT Filed: Apr. 28, 2009

(86) PCT No.: PCT/JP2009/058394
§ 371 (c)(1),
(2), (4) Date: Oct. 27, 2011

(87) PCT Pub. No.: WO2010/125651
PCT Pub. Date: Nov. 4, 2010

(65) Prior Publication Data
US 2012/0037745 A1 Feb. 16, 2012

(51) Int. Cl.
*B65H 54/64* (2006.01)
(52) U.S. Cl.
USPC .............. 242/438.1; 242/439.6; 242/441.1; 242/444; 242/445.1
(58) Field of Classification Search .......... 254/438, 254/438.1, 439.5, 439.6, 441.1, 444, 445.1
See application file for complete search history.

(56) References Cited

U.S. PATENT DOCUMENTS

| | | | | |
|---|---|---|---|---|
| 3,128,216 A | * | 4/1964 | Reed | 156/190 |
| 3,378,427 A | * | 4/1968 | McClean | 156/431 |
| 3,886,029 A | * | 5/1975 | Poulsen | 242/444 |
| 4,251,036 A | * | 2/1981 | McLain | 242/444 |
| 4,541,887 A | * | 9/1985 | Carter | 156/431 |
| 5,897,729 A | * | 4/1999 | Bikson et al. | 156/172 |
| 6,540,171 B2 | * | 4/2003 | Yasui et al. | 242/437 |
| 7,374,127 B2 | * | 5/2008 | Gallagher et al. | 242/444 |
| 2001/0013563 A1 | * | 8/2001 | Yasui et al. | 242/447.2 |
| 2003/0052212 A1 | * | 3/2003 | Anderson et al. | 242/436 |

FOREIGN PATENT DOCUMENTS

| | | |
|---|---|---|
| CN | 1871116 A | 11/2006 |
| JP | 60-189428 A | 9/1985 |
| JP | 04-308166 A | 10/1992 |
| JP | 08-011221 A | 1/1996 |

(Continued)

OTHER PUBLICATIONS

International Search Report mailed Jul. 7, 2009 of PCT/JP2009/058394.

*Primary Examiner* — Emmanuel M Marcelo
(74) *Attorney, Agent, or Firm* — Kenyon & Kenyon LLP

(57) ABSTRACT

Disclosed is a filament winding device wherein an FRP layer is prevented from becoming thick by avoiding piled fibers in the case of the feeding of multiple filaments when a plurality of fibers are fed simultaneously. For realizing this theme, a filament winding device moves a fiber guide member equipped with a plurality of fiber feeding ports relatively in an axial direction of a wound member rotating relatively about the axis, and feeds fibers through the fiber feeding ports to wind the fibers around the wound member, wherein the fiber feeding ports are provided only in part of the fiber guide member. When the fiber guide member is moved relatively in the axial direction of the wound member, a plurality of fibers are fed only from one side when viewed from the wound member and the fibers are wound around the wound member while being gathered on the periphery of the wound member.

9 Claims, 13 Drawing Sheets

FOREIGN PATENT DOCUMENTS

| | | |
|---|---|---|
| JP | 2004-314550 A | 11/2004 |
| JP | 2007-260976 A | 10/2007 |
| JP | 2008-195000 A | 8/2008 |
| WO | 2010/116527 A1 | 10/2010 |

* cited by examiner

INTERSECTING PORTIONS OF
FIBERS ARE ENTIRELY GENERATED

US 8,424,793 B2

FILAMENT WINDING DEVICE AND FILAMENT WINDING METHOD

This is a 371 national phase application of PCT/JP2009/058394 filed 28 Apr. 2009, the contents of which are incorporated herein by reference.

TECHNICAL FIELD

The present invention relates to a filament winding device and a filament winding method, and more particularly, it relates to an improvement of a winding method of fibers in filament winding.

BACKGROUND ART

As a tank (a pressure container) which is used for the storage of hydrogen or the like, there has been utilized a tank including an FRP layer in which hoop layers and helical layers are alternately laminated on the outer periphery of a liner. Each of the hoop layers is a layer formed by hoop-winding fiber bundles (e.g. bundles of carbon fibers) (a winding way of winding the fiber bundles around a tank trunk part substantially vertically to a tank axis), and each of the helical layers is a layer formed by helically winding the fiber bundles (a winding way of winding the fiber bundles up to a tank dome part substantially in parallel with the tank axis) (see FIG. 2, etc.).

When the fiber bundles are wound around the surface of the liner by a filament winding method, it is required to simultaneously wind the plurality of fiber bundles and as uniformly as possible, and hence there has been utilized a multiple-filaments feeding type filament winding device which can simultaneously feed the plurality of fiber bundles. In the multiple-filaments feeding type filament winding device, a plurality of fiber feeding ports called eye ports which perform a forward-backward movement, a right-left movement and rotation are arranged at equal intervals in the form of a ring around a mandrel. When the mandrel is rotated around the center of these eye ports, the plurality of fiber bundles can simultaneously be wound around the mandrel and as uniformly as possible. When the multiple-filaments feeding type filament winding device is utilized, time required for the filament winding can noticeably be shortened, as compared with a usual one-eye port (monofilament feeding) equipment.

Heretofore, as the multiple-filaments feeding type filament winding device, there has been suggested a device including a helical winding head to helically wind the plurality of fiber bundles around the mandrel, and this helical winding head includes at least two guide lines constituted of a plurality of guide portions arranged along a peripheral direction of a mandrel, and a position change mechanism which relatively rotates the respective guide lines to make positions of the respective guide portions changeable (see e.g. Patent Document 1)

PRIOR ART DOCUMENTS

Patent Documents

[Patent Document 1] JP 2008-195000 A

DISCLOSURE OF THE INVENTION

Problems to be Solved by the Invention

However, in the conventional device described above, when the position change mechanism arranges guide portions at such positions that the guide portions overlap with each other, two fiber bundles are wound as a set of piled fiber bundles sometimes. In consequence, an FRP layer becomes thick sometimes.

Therefore, an object of the present invention is to provide a filament winding device which prevents an FRP layer from becoming thick by avoiding piled fibers in the case of the feeding of multiple filaments when a plurality of fiber bundles are fed simultaneously, and a filament winding method.

Means for Solving the Problems

To solve such a theme, the present inventors have performed various investigations. When a helical layer is formed through filament winding by use of a multiple-filaments feeding type filament winding device, a filament winding pattern cannot become a smooth pattern but surely becomes a mesh pattern (see FIG. 18 and FIG. 19). That is, a plurality of eye ports of the multiple-filaments feeding type filament winding device are arranged at equal intervals around a mandrel. In consequence, when the helical layer is formed through the filament winding while keeping this configuration, the number of intersecting times of fiber bundles increases, to form the mesh pattern. In this case, as compared with, for example, a smooth pattern (a pattern in which the fiber bundles do not pile on each other but are smoothly wound) in a hoop layer, structural bends (undulations) occur in the fiber bundles, and a strength development ratio lowers. Additionally, a quality of FRP deteriorates sometimes. The present inventors have performed investigations on how to decrease the structural bends (undulations) which might occur in the fiber bundles of the helical layer, and have obtained a new finding concerned with the solution of the theme.

According to the present invention developed on the basis of such a finding, there is provided a filament winding device which moves a fiber guide member equipped with a plurality of fiber feeding ports relatively in an axial direction of a wound member rotating relatively about the axis, and feeds fibers through the fiber feeding ports to wind the fibers around the wound member, wherein the fiber feeding ports are provided only in part of the fiber guide member.

As described above, in the conventional filament winding device, the plurality of eye ports are usually arranged at equal intervals around the mandrel or the like. More specifically, the eye ports are arranged at equal intervals in the whole periphery of the guide member called a ring eye or the like (e.g. a ring-like guide disposed around the wound member). While the ring eye is moved in an axial direction of the mandrel and relatively rotated about the axis, the fibers are fed out of these eye ports, respectively (see FIG. 20 and FIG. 21). At this time, while the ring eye relatively reciprocates along the axial direction, the ring eye winds the fibers around the mandrel. However, when the ring eye is moved from one end side to the other end side of the mandrel and is further returned to the one end side (the ring eye is reciprocated), intersecting portions of the fibers are generated in the whole periphery of the mandrel (see portions surrounded with broken lines in FIG. 22). In this case, the filament winding pattern does not become the smooth pattern but becomes the mesh pattern (see FIG. 18 and FIG. 19).

In this respect, in the case of the filament winding device according to the present invention, the fiber feeding ports (the eye ports) are provided only in part (e.g. a semicircular portion) of the fiber guide member (the ring eye), and the fibers are fed from one side of the wound member (the mandrel or the like) (see FIG. 9). In this device, when the fiber guide member is moved from the one end side to the other end side of the wound member, a plurality of fibers in a bundled state can be wound around the wound member (see FIG. 14). Moreover, when the fiber guide member is moved backwards and returned to the one end side (the fiber guide member is reciprocated), the fibers are wound around the wound member while the fibers are similarly bundled. In this case, the intersecting portions of the fibers gather substantially in the vicinity of the center of an FRP formed article (e.g. a tank), and the number of the intersecting portions of the fibers decreases (see FIG. 15). Therefore, unlike the conventional mesh pattern, it is possible to form a layer (e.g. a smooth helical layer) with the smooth pattern (the fibers do not pile on each other but are smoothly wound). In consequence, in the case of multiple-filaments feeding when the plurality of fibers are simultaneously fed, the FRP layer can be prevented from becoming thick by avoiding the piled fibers.

Moreover, the fiber feeding ports in the filament winding device of the present invention are provided so that a fiber feeding angle of the fibers can be varied. In this case, the fiber feeding ports are preferably provided in the fiber guide member so that the ports can rotatably operate along a plane including the fiber guide member. Moreover, the fiber feeding ports are further preferably operated in such a direction that the plurality of fibers gather on one portion of the wound member. When the fiber feeding ports having the variable fiber feeding angle are utilized, it is possible to easily cope with a wound member having a different diameter, and it is possible to cope with a case where a part having a different shape or diameter, for example, a dome part of a tank is set as an object. That is, when the fiber feeding angle is appropriately changed in accordance with a change of a diameter of an object portion around which the fibers are wound, the plurality of fibers in a gathered state are wound regardless of the outer diameter of the wound member, and the number of the intersecting portions of the fibers can be decreased.

Furthermore, the fiber feeding ports in the filament winding device is preferably slidable to change a fiber feeding position of the fibers. Moreover, the fiber feeding ports are preferably expandable/contractible to change a fiber feeding position of the fibers.

Moreover, in the filament winding device according to the present invention, a coverage of the wound member with the fibers when the fiber guide member is reciprocated relatively in the axial direction of the wound member is preferably smaller than 50%. In general, it is most preferable to wind the fibers around the wound member without any excess/deficiency, that is, with a coverage of 100%. However, when FRP layers are laminated, the coverage gradually decreases, as an outer diameter increases. Therefore, it is difficult sometimes to realize a coverage which is close to 100%. In this respect, according to the filament winding device of the present invention in which the coverage is set to be smaller than 50%, if the coverage is slightly below 50%, the fibers are wound twice (reciprocated twice). If the coverage is 33%, the fibers are wound three times (reciprocated three times). When the number of the winding times is appropriately changed in accordance with a situation in this manner, a preferable fiber coverage can be realized.

Moreover, in the above filament winding device, a creel stand which receives the fibers is preferably disposed only on one side of the fiber guide member. In general, the creel stand including a large number of fiber bobbins is large-scaled. Additionally, a pair of creel stands are arranged on both sides of the fiber guide member often, which easily causes the enlargement of the device. Moreover, as means for the miniaturization of the whole device, it has been suggested that all the creel stands are arranged only on one side of the fiber guide member. In this case, however, the half of the fibers are passed through a ceiling to be fed from one side of the device (the one side) to the other side thereof. Such a large-scaled equipment or the like is required, and hence the means cannot be fundamental solution means. In this respect, the present invention has a constitution in which the fibers are fed from one side of the wound member (the mandrel or the like) (see FIG. 9). Therefore, in conformity to this constitution, the creel stands are arranged only on the one side of the fiber guide member, which achieves the miniaturization of the whole filament winding device.

Moreover, according to the present invention, there is provided a filament winding method comprising the steps of: moving a fiber guide member equipped with a plurality of fiber feeding ports in an axial direction of a wound member rotating relatively about the axis; and feeding fibers through the fiber feeding ports to wind the fibers around the wound member, wherein the step of moving the fiber guide member relatively in the axial direction of the wound member feeds a plurality of fibers only from one side when viewed from the wound member, and winds the fibers around the wound member while the fibers are gathered on the periphery of the wound member.

Advantageous Effect of the Invention

According to the present invention, an FRP layer can be prevented from becoming thick by avoiding piled fibers in the case of the feeding of multiple filaments when a plurality of fibers are fed simultaneously.

MODE FOR CARRYING OUT THE INVENTION

Figure 1:
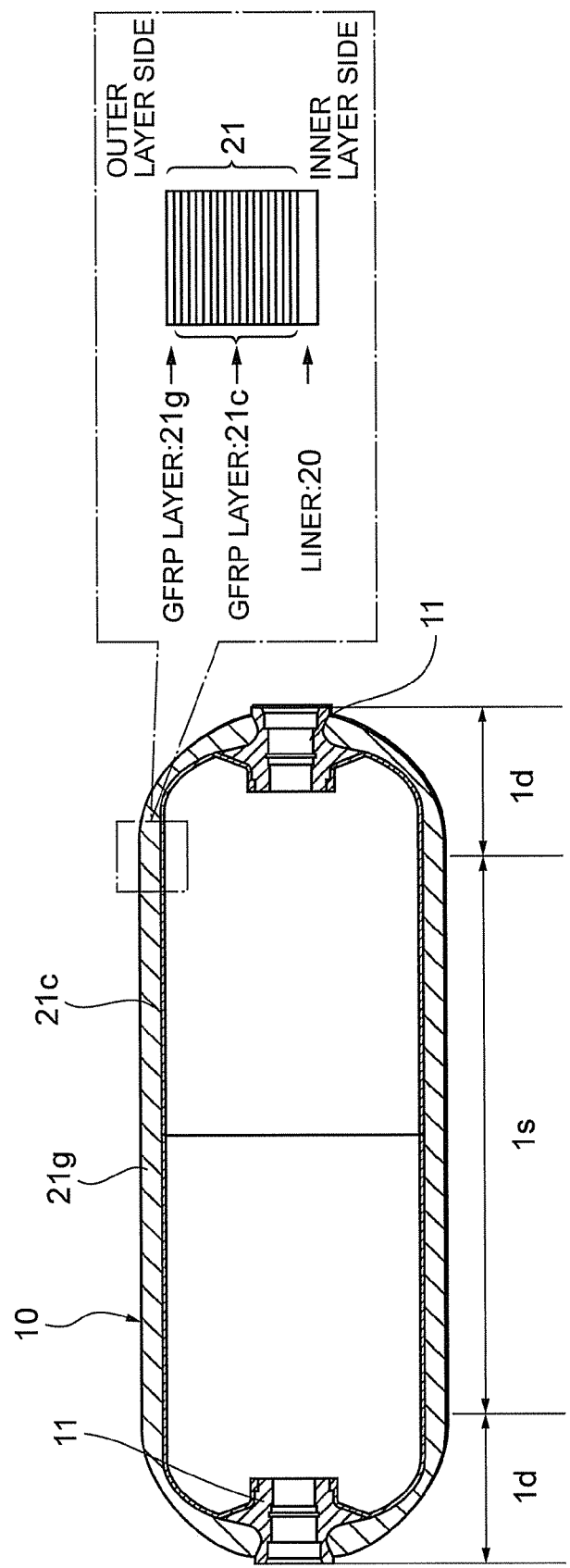
FIG. 1 is a sectional view and a partially enlarged view showing a structure of a high pressure tank in one embodiment of the present invention.

Hereinafter, a constitution of the present invention will be described in detail with respect to an example of a mode for carrying out the invention shown in drawings.

FIG. 1 to FIG. 17 show an embodiment of a filament winding device and a filament winding method according to the present invention. Hereinafter, there will be described illustration of a case where an FRP layer 21 of a high-pressure hydrogen tank (hereinafter referred to also as the high-pressure tank) 1 as a hydrogen fuel supply source is formed by using a filament winding device 1 according to the present invention. The high-pressure tank 1 which receives hydrogen can be utilized in a fuel cell system or the like.

The high-pressure tank 1 includes, for example, a cylindrical tank main body 10 having both ends with a substantially semispherical shape, and a mouthpiece 11 attached to an end of the tank main body 10 in a longitudinal direction. It is to be noted that in the present description, a substantially semispherical part is referred to as a dome part, a cylindrical trunk part is referred to as a straight part, and the parts are denoted with marks 1d and 1s, respectively (see FIG. 1, FIG. 2, etc.). Moreover, the high-pressure tank 1 according to the present embodiment has the mouthpieces 11 at both ends, but for the convenience of the description, the high-pressure tank is described with reference to FIG. 3 showing the main section of the high-pressure tank 1 in which a positive direction (a direction shown by an arrow) of an X-axis is a tip side and a negative direction thereof is a base side. A positive direction (a direction shown by an arrow) of a Y-axis which is vertical to the X-axis indicates a tank outer peripheral side.

The tank main body 10 includes, for example, a wall layer having a two-layers structure, and includes a liner 20 which is an inner wall layer and, for example, an FRP layer 21 as a resin fiber layer (a reinforcing layer) which is an outer wall layer outside the liner. The FRP layer 21 is formed by, for example, an only CFRP layer 21c, or the CFRP layer 21c and a GFRP layer 21g (see FIG. 1).

The liner 20 is formed into substantially the same shape as the tank main body 10. The liner 20 is made of, for example, a polyethylene resin, a polypropylene resin, another hard resin or the like. Alternatively, the liner 20 may be a metal liner made of aluminum or the like.

On the tip side of the liner 20 provided with the mouthpiece 11, an inwardly bent folded part 30 is formed. The folded, part 30 is folded back toward the inside of the tank main body 10 so that the folded part is disposed away from the outside FRP layer 21.

The mouthpiece 11 has a substantially cylindrical shape, and is fitted into the opening of the liner 20. The mouthpiece 11 is made of, for example, aluminum or an aluminum alloy, and manufactured into a predetermined shape by, for example, a die cast process or the like. The mouthpiece 11 is fitted into a divided liner formed by injection. The mouthpiece 11 may be attached to the liner 20 by, for example, insert forming. The mouthpiece 11 is provided with a valve assembly 50 (see FIG. 2).

Moreover, in the mouthpiece 11, for example, a valve fastening flange 11a is formed on the tip side (outside the high-pressure tank 1 in an axial direction), and an annular recess portion 11b is formed behind the valve fastening flange 11a (inside the high-pressure tank 1 in the axial direction) with respect to the axis of the high-pressure tank 1. The recess portion 11b is curved to project on an axis side and has an R-shape. The recess portion 11b comes in contact with the vicinity of the tip of the FRP layer 21 having the same R-shape in an airtight manner.

For example, the surface of the recess portion 11b which comes in contact with the FRP layer 21 is provided with solid lubrication coating C such as a fluoric resin. This decreases a friction coefficient between the FRP layer 21 and the recess portion 11b.

Further behind the recess portion 11b of the mouthpiece 11, there is formed, for example, a collar portion 11c adapted to the shape of the folded part 30 of the liner 20 and having a large diameter continuously with the recess portion 11b, and behind the collar portion 11c, there is formed a mouthpiece cylindrical portion 11d having a predetermined diameter.

The FRP layer 21 is formed, for example, by winding fibers (reinforcing fibers) 70 impregnated with a resin around the outer peripheral surface of the liner 20 and the recess portion 11b of the mouthpiece 11 through filament winding forming (FW forming), and hardening the resin. As the resin of the FRP layer 21, for example, an epoxy resin, a modified epoxy resin, an unsaturated polyester resin or the like is used. Moreover, as the fibers 70, carbon fibers (CF), metals fiber or the like are used. During the FW forming, while rotating the liner 20 around a tank axis, a guide (in the present embodiment, a ring eye equipped with eye ports 140 which will be described later) of the fibers 70 is moved along the tank axial direction, whereby the fibers 70 can be wound around the outer peripheral surface of the liner 20. It is to be noted that in actual, a fiber bundle in which a plurality of fibers 70 are bundled is usually wound around the liner 20, but in the present description, the fibers including the case of the fiber bundle are simply called the fibers. Moreover, examples of fibers 70 for use in this manner include fibers beforehand impregnated with a thermosetting synthetic resin material and fibers which are not impregnated with the material. Although especially not shown, the fibers 70 can be impregnated halfway while the fibers are fed to the liner 20, when the fibers 70 which are not impregnated are used.

Next, there will be described a fiber winding pattern for decreasing structural bends of the fibers (e.g. carbon fibers CF) 70 in the tank 1 (see FIG. 2, etc.).

As described above, the tank 1 is formed by winding the fibers (e.g. the carbon fibers) 70 around the outer periphery of the liner 20 and hardening the resin. Here, the winding of the fibers 70 includes hoop winding and helical winding, a hoop layer is formed by hoop-wound layers of the resin, and a helical layer (denoted with mark 70H in FIG. 4 and FIG. 5) is formed by helically wound layers, respectively. In the former hoop winding, the fibers 70 are wound around the straight part (the tank trunk part) of the tank 1 in the form of a coil spring to tightly wind the corresponding part, and a force for countering a force directed in a Y-axis positive direction (a force to expand to the outside in a diametric direction) is exerted on the liner 20 by a gas pressure. On the other hand, the latter helical winding is a winding way for a main purpose of tightly winding the dome part (an inward direction of the tank in the axial direction), and the fibers 70 are wound around the whole tank 1 so that the fibers are caught by the dome part, thereby mainly contributing to the enhancement of the strength of the dome part. It is to be noted that an angle (an acute angle) formed by a helix (a screw thread line in a screw) of the fibers 70 wound in the form of the coil spring and the center line (a tank axis 12) of the tank 1 is "a winding angle with respect to the tank axis (12)" of the fibers 70 mentioned in the present description and denoted with mark α in FIG. 2 (see FIG. 2).

Figure 2:
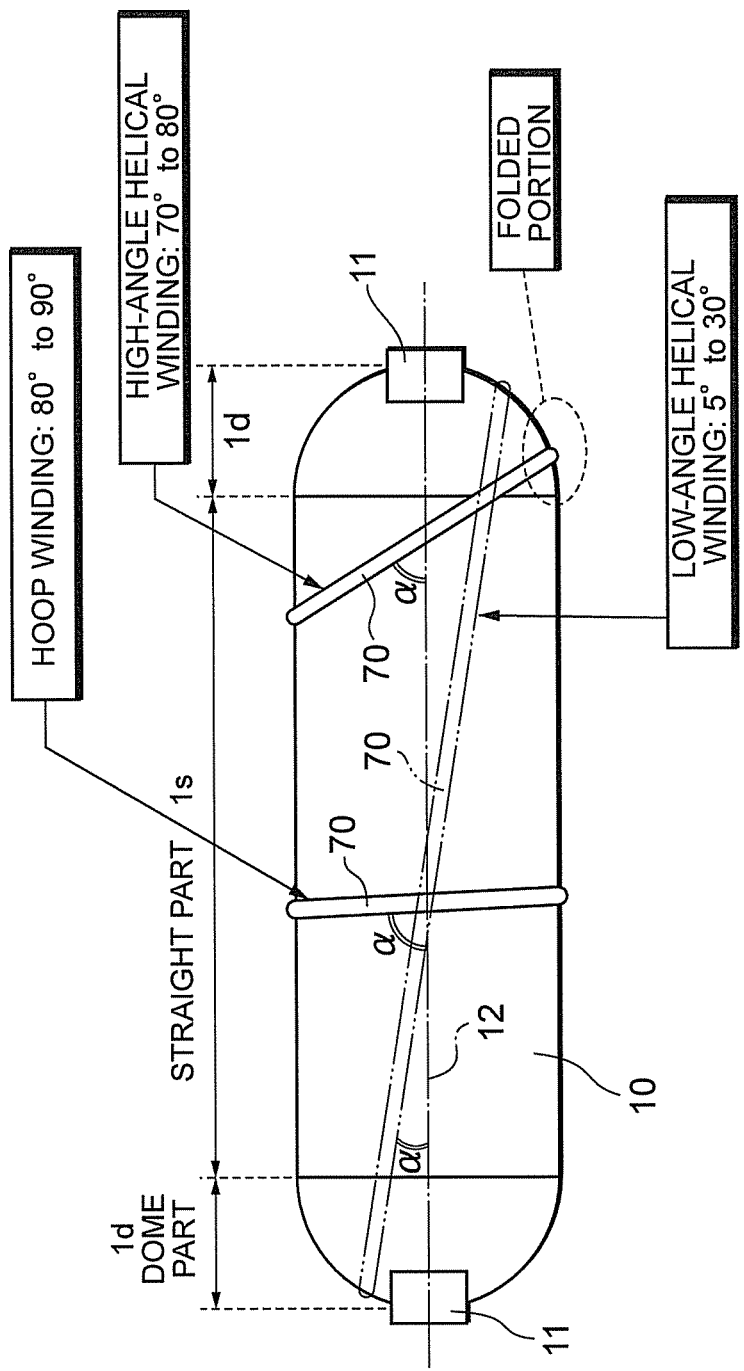
FIG. 2 is a view showing the structure of the high-pressure tank in the embodiment of the present invention.
Figure 3:
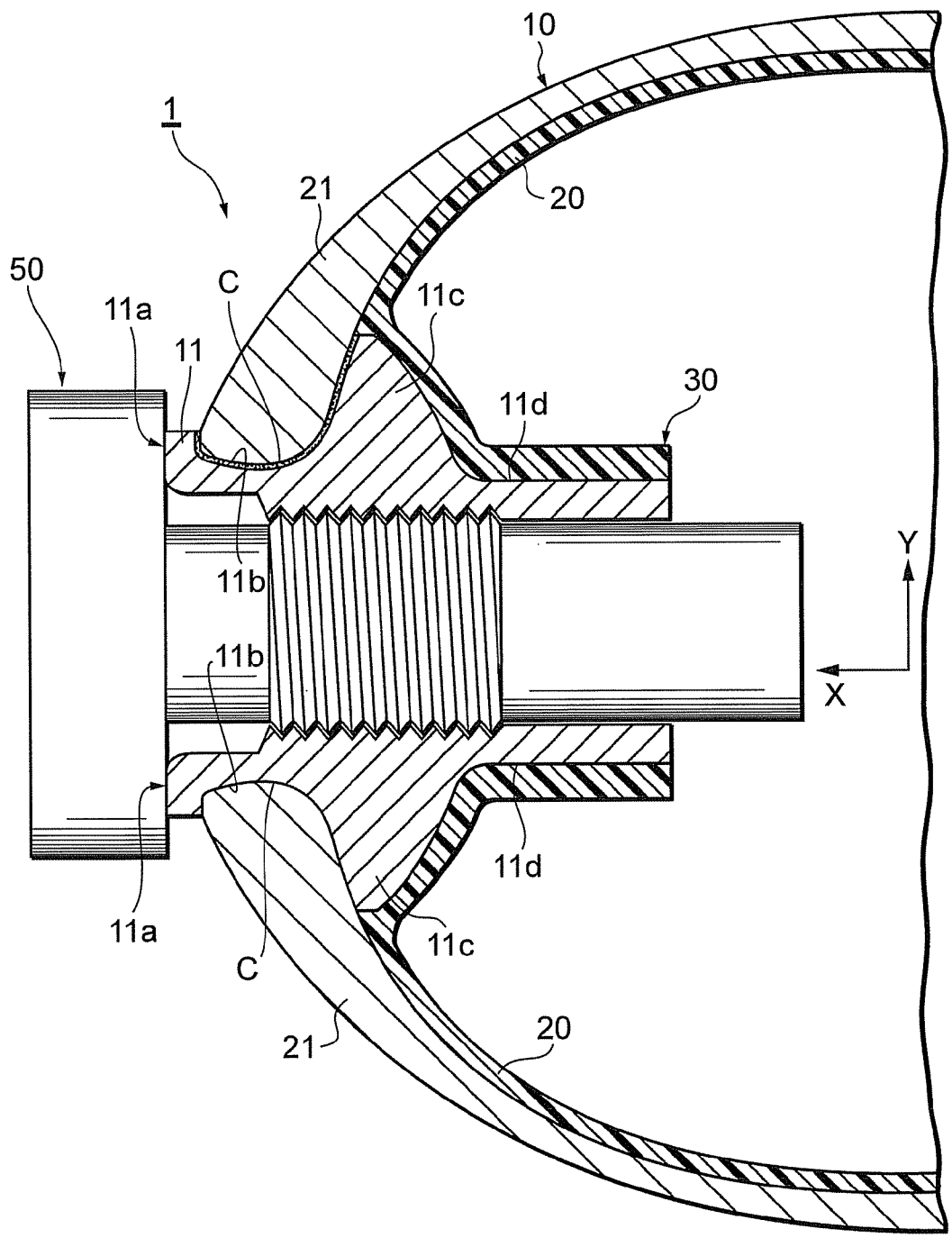
FIG. 3 is a sectional view showing a structure example in the vicinity of a mouthpiece of the tank.

In the hoop winding among these various winding ways, the fibers 70 are wound around the straight part substantially vertically to the tank axis, and in this case, a specific winding angle is, for example, from 80 to 90° (see FIG. 2). The helical winding (or impress winding) is a winding way of also winding the fibers 70 around the dome part, and the winding angle with respect to the tank axis is smaller than in the hoop winding (see FIG. 2). The helical winding is roughly divided into two types of high-angle helical winding and low-angle helical winding, and in the high-angle helical winding, the winding angle with respect to the tank axis is comparatively large, and a specific example of the winding angle is from 70 to 80°. On the other hand, in the low-angle helical winding, the winding angle with respect to the tank axis is comparatively small, and a specific example of the winding angle is from 5 to 30°. It is to be noted that in the present description, helical winding with a winding angle of 30 to 70° which is an angle between the above angles is referred to as medium-angle helical winding sometimes. Furthermore, helical layers formed by the high-angle helical winding, the medium-angle helical winding and the low-angle helical winding are called a high helical layer, a medium helical layer and a low helical layer, respectively. Moreover, a folded portion of the high-angle helical winding in the dome part 1d along the tank axial direction is called a folded portion (see FIG. 2).

Usually, in the hoop winding itself, the fibers 70 are spirally wound while the fibers are disposed adjacent to each other, and in the winding way, the fibers 70 can be wound so that the piling of the fibers 70 (wrapping) is eliminated to prevent unevenness from being generated. On the other hand, the helical winding is usually performed for the main purpose of tightly winding the dome part, and in the winding way, it is difficult to decrease the piling of the fibers 70 and the unevenness, or the decreasing of these defects is not sufficiently taken into consideration (see e.g. an uneven helical layer of a mesh pattern shown in FIG. 18 and FIG. 19). The hoop winding and the helical winding are appropriately combined in accordance with specifications such as an axial length and a diameter of the tank 1, and the hoop layer (not shown) and the helical layer 70H are laminated around the liner 20 (see FIG. 1, etc.). At this time, when the hoop layer is disposed adjacent to the helical layer 70H, the unevenness of the helical layer 70H is transferred to the hoop layer, and bends (undulations) are generated sometimes in the fibers 70 of the hoop layer.

In this respect, in the present embodiment, the helical layer (the smooth helical layer) 70H having a smooth filament winding pattern is formed through filament winding by use of a filament winding device 100, and unevenness which might occur in the hoop layer disposed adjacent to this helical layer is decreased. The smooth helical layer 70H which will be described later is a layer formed through the helical winding so as to decrease the piling of the fibers 70 on each other. In the smooth helical layer 70H, the next fiber 70 is in principle wound to be disposed right beside the adjacent fiber 70, and the piling of the fibers 70 is different from that in a conventional uneven helical layer (the helical layer which is not subjected to a smoothening treatment and which has unevenness occurring on the surface thereof as denoted with mark 70B in FIG. 18 and FIG. 19). In particular, the innermost helical layer (an inner layer having a so-called high in-plane stress) 70H is preferentially formed as the smooth helical layer (the innermost smooth helical layer). Additionally, the fibers 70 are hoop-wound around the outside of the innermost smooth helical layer 70H to form the hoop layer. In this case, it is possible to decrease structural bends (undulations), waving, and swell of the fibers 70 in the hoop layer. That is, the surface (the surface layer) of the smooth helical layer 70H has a smoother surface, and hence in the hoop layer formed on the smooth surface, the structural bends (undulations) of the fibers 70 due to the unevenness decrease. When the structural bends (undulations) of the fibers 70 of the hoop layer are suppressed in this manner, a fatigue strength of the fibers 70 can be enhanced, and it is possible to obtain advantages that the hoop layer becomes thin and has higher Vf to enhance a burst strength. Moreover, since the innermost helical layer 70H itself is smooth, the burst strength can be enhanced through the thin layer and the high Vf. Vf indicates the fiber volume content ratio. When the value (Vf value) increases, the content ratio of the fibers becomes high, and the content ratio of the resin becomes small. If the value of Vf is excessively high, fatigue durability deteriorates. If the value is excessively lowered, an outer diameter of the tank becomes large.

Additionally, the present embodiment has an advantage that a tank strength can noticeably be enhanced. That is, a layer positioned on an inner side (the layer disposed close to the liner 20) has a larger degree of contribution to the tank strength in both the helical layer 70H and the hoop layer. In particular, the hoop layer of the innermost layer has a large function in that the straight part is tightly wound to sufficiently exert a withstanding pressure. In this respect, at least the innermost helical layer 70H is formed as the smooth helical layer, whereby the hoop layer disposed adjacent to the outside of the smooth helical layer 70H can smoothly be formed, and the hoop layer can noticeably contribute to the enhancement of the tank strength.

Moreover, the layer disposed adjacent to the hoop layer is preferably another hoop layer or the smooth helical layer 70H. The surface of the other hoop layer or the smooth helical layer 70H is smoother than the surface of another layer. When a certain hoop layer is formed, the fibers 70 are hoop-wound around the outside of another hoop layer or the smooth helical layer 70H, whereby the structural bends (undulations) of the fibers 70 in the hoop layer can be decreased. Therefore, the fatigue strength of the fibers 70 is enhanced. Moreover, the hoop layer is made thin and provided with the high Vf (the fiber volume content ratio), whereby the burst strength can be enhanced.

Figure 6:
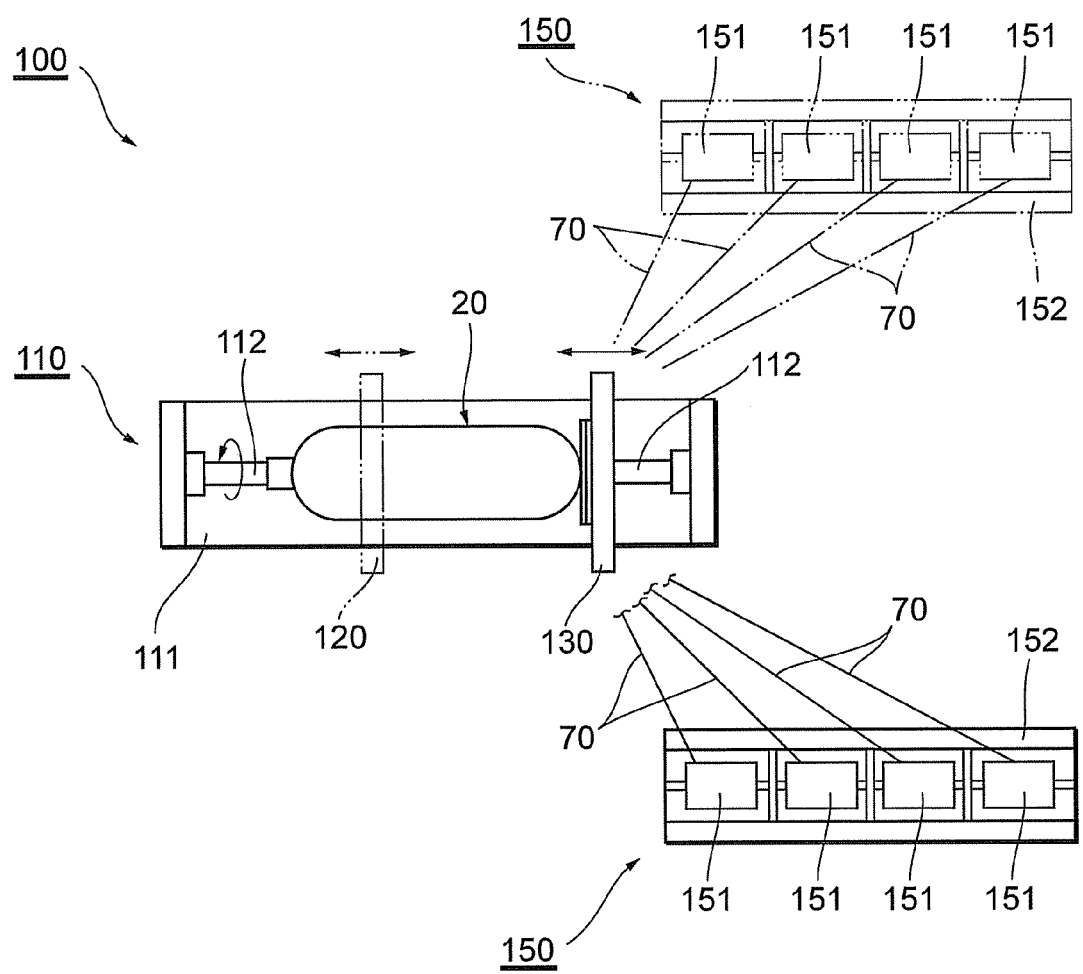
FIG. 6 is a plan view of a filament winding device showing an embodiment of the present invention.

Next, there will be described the filament winding (FW) device 100 of the present embodiment which can form the smooth helical layer 70H (see FIG. 6, etc.).

The filament winding device 100 of the present embodiment is a device which moves a ring eye (a fiber guide member) equipped with a plurality of eye ports (fiber feeding ports) 140 in the axial direction of the liner 20 (the same axial direction as the direction of the tank axis 12 in the present embodiment), and feeds the fibers 70 through the eye ports 140 to wind the fibers around the liner 20 (perform filament winding). As shown, the filament winding device 100 of the present embodiment is constituted of a winding device main body portion 110 in which the filament winding is performed, and a fiber feeding portion 150 which feeds the fibers 70 to the device main body portion 110 (see FIG. 6).

On a base 111 of the device main body portion 110, there are provided a hoop winding head 120 which forms the hoop layer, a ring eye 130 which performs a function of a helical winding head to form the helical layer 70H, rotation means for rotating the liner 20, a control section 113 which controls the rotating means, and the like. The rotating means is constituted of, for example, a spindle 112, a motor (not shown) which rotates the spindle 112, and the like. The control section 113 of the present embodiment controls the start and stop of the spindle 112, a rotation speed thereof, the start and stop of the hoop winding head 120 and the ring eye 130, a rotating speed thereof and the like.

Figure 7:
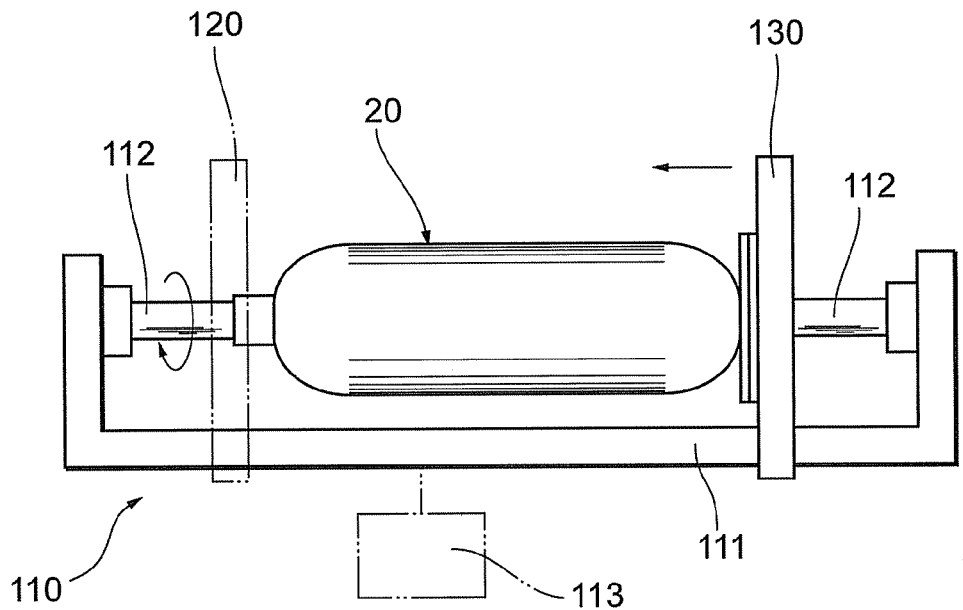
FIG. 7 is a side view of a device main body portion of the filament winding device.
Figure 8:
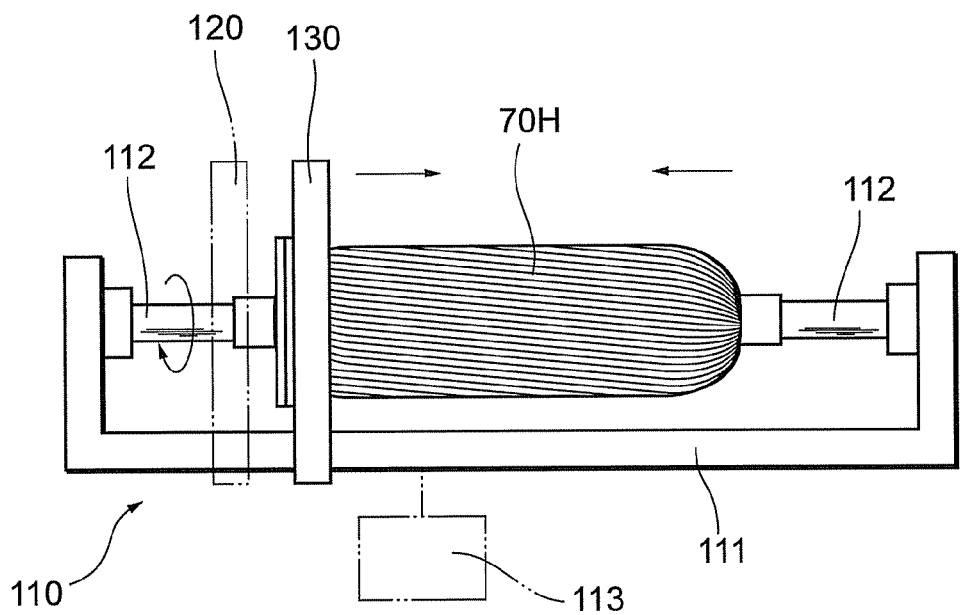
FIG. 8 is a side view of the filament winding device in a case where a ring eye moves to form a helical layer 70H.
Figure 9:
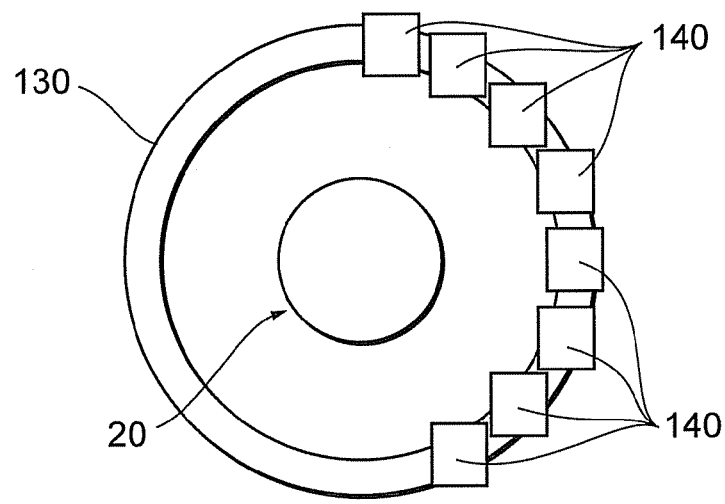
FIG. 9 is a view showing a concept of a constitution of the ring eye and eye ports to which the present invention is applied.

Both of the hoop winding head 120 and the ring eye 130 include hollows which are larger than the liner 20, respectively, and are provided reciprocateably around the liner 20 in a direction of a rotary shaft of the liner 20 (see FIG. 7). The hoop winding head 120 feeds the fibers 70 while moving with a comparatively slow speed in the axial direction, to form the hoop layer around the liner 20. On the other hand, the ring eye 130 feeds the fibers 70 while moving with a speed higher than the hoop winding head 120 in the axial direction, to form the helical layer 70H around the liner 20 (see FIG. 8, etc.). Although particularly not shown in detail here, a known device such as a uniaxial slide mechanism including a guide rail, a stepping motor, a ball screw and the like is used as a device for reciprocating the ring eye 130 or the like.

The ring eye 130 is an annularly formed fiber guide member. The ring eye 130 includes the plurality of eye ports 140 only in part of the ring eye 130 (see FIG. 9). For example, in the ring eye 130 of the present embodiment, the eye ports 140 are arranged only in substantially the half of the annular ring eye 130 (a semicircular portion on one side) (see FIG. 10 and FIG. 11). Each of the plurality of eye ports 140 is a member having, for example, a cylindrical shape or the like, and feeds the fibers 70 to the liner 20.

Moreover, the eye ports 140 preferably can appropriately change a fiber feeding position or fiber feeding angle of the fibers 70. In this case, the plurality of fibers 70 can constantly gather in the outer periphery of the liner 20 in accordance with a change of a liner diameter. For example, the eye ports of the present embodiment can revolvably operate along a plane including the ring eye 130 on the ring eye 130 (see an operation (iii) in FIG. 10), can slide (see an operation (i) in FIG. 10), and rotate about a long axis of a cylinder (see an operation (ii) in FIG. 10). The sliding mentioned herein includes both a case where the whole eye ports slide and a case where part of the eye ports slide and the total length of each of the eye ports expands or contracts.

When the eye ports which can relatively operate independently of one another with respect to the ring eye 130, respectively, are utilized, the plurality of fibers 70 can gather in one portion. That is, when the fibers 70 are wound around a large diameter part such as the straight part 1s of the high-pressure tank 1 (see FIG. 10) or the fibers 70 are wound around a small diameter part such as the dome part 1d of the tank 1 (see FIG. 11), the directions of the eye ports 140 are changed in accordance with a size of the diameter. Furthermore, when the eye ports 140 are slid as required to the fiber feeding position in a diametric direction, the fibers 70 can be gathered.

Figure 11:
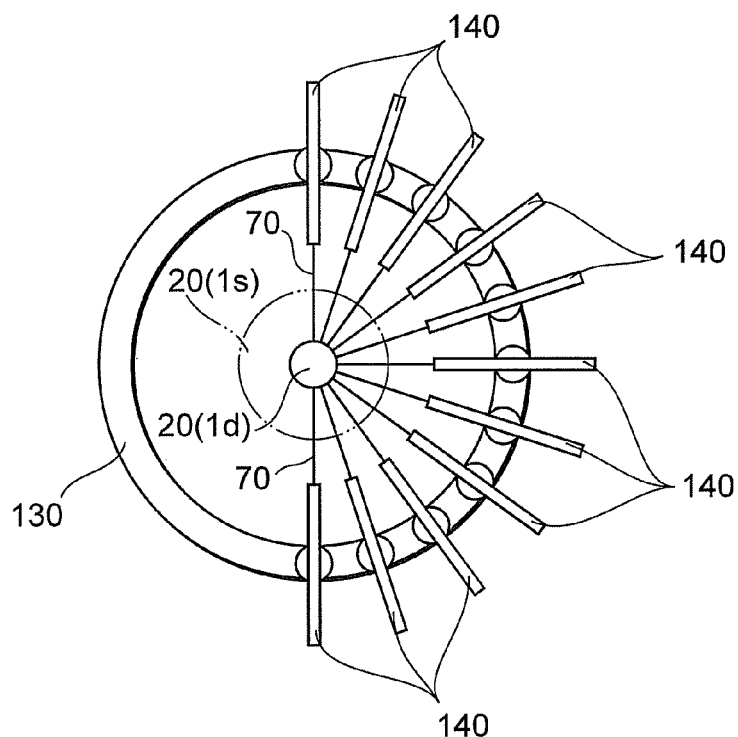
FIG. 11 is a view showing the constitution of the ring eye and the eye ports in a case where fibers are wound around a dome part of a liner.
Figure 12:
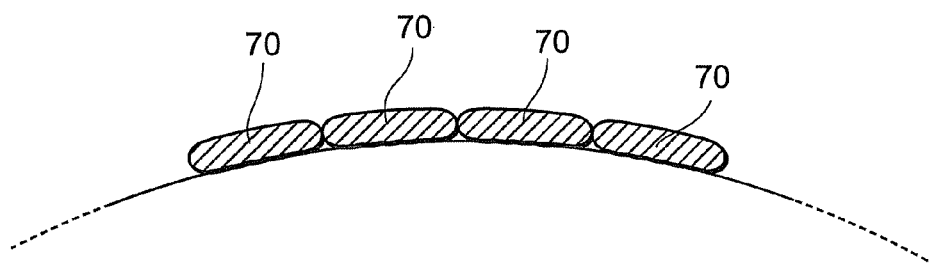
FIG. 12 is a view showing a behavior of fibers (a fiber bundle) having a flat section in a case where the fibers are wound around the liner.
Figure 13:
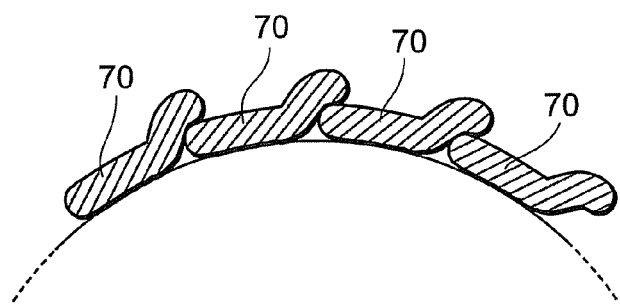
FIG. 13 is a view showing the behavior of the fibers (the fiber bundle) in the case where the fibers are wound around the dome part of the liner.

In general, the fibers (the fiber bundles) 70 wound around the liner 20 become flat owing to an influence of a tensile force from an already wound part (see FIG. 12). Therefore, in the present embodiment, the plurality of fibers 70 are wound around the outer periphery of the liner 20 in a state where the piling (wrapping) of the fibers does not occur but the fibers are disposed adjacent to each other without any space therebetween (see FIG. 10 and FIG. 12). On the other hand, when the fibers 70 are wound around a part having a semispherical shape as in the dome part 1d of the tank 1 and having a diameter smaller than the straight part 1s, the fibers 70 are preferably gathered in a narrower region while piling part of the fibers 70 on each other (see FIG. 11 and FIG. 13). According to the filament winding device 100 of the present embodiment, when the fiber feeding angle or position is appropriately changed in accordance with the change of the diameter of the object part around which the fibers 70 are wound, the plurality of fibers in a gathered state are wound regardless of the size of the diameter of the object part, and the number of the intersecting portions of the fibers 70 with each other can be decreased.

It is to be noted that means for relatively operating the eye ports 140 independently of each other with respect to the ring eye 130, respectively, as described above is not especially shown, but such means can be constituted of a known member such as a servo motor or an actuator, a slide mechanism, a rotary shaft, a gear or a pulley disposed for each of the eye ports 140.

Figure 14:
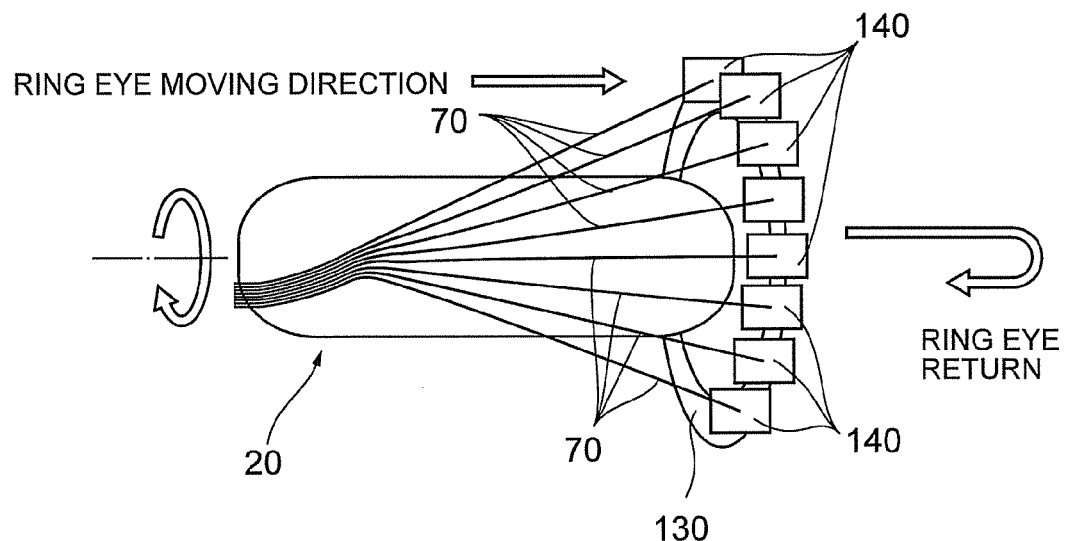
FIG. 14 is a view showing a behavior in a case where the ring eye is moved to wind the gathered fibers around the liner.
Figure 15:
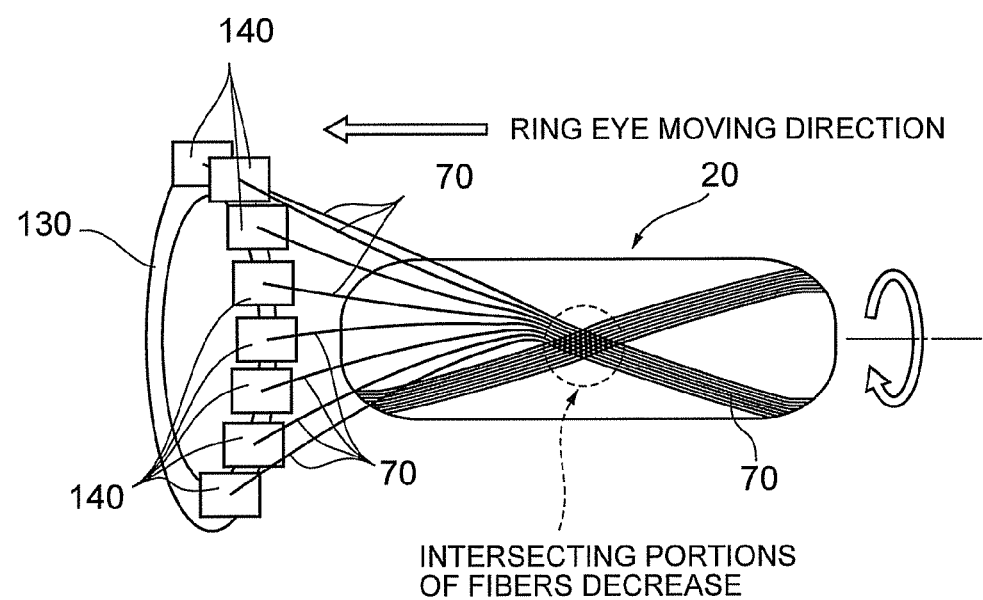
FIG. 15 is a view showing a behavior in a case where the ring eye is moved backwards and the gathered fibers are wound around the liner.
Figures 16A, 16B:
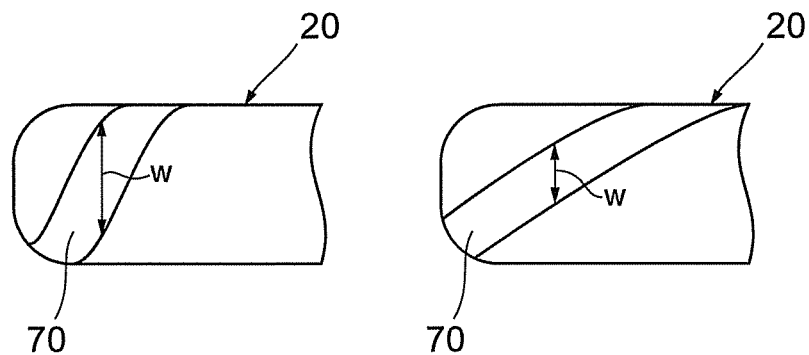
FIG. 16 is a view showing a behavior that a width of the fibers in a peripheral direction changes in accordance with a size of a winding angle α, (A) shows a case where the winding angle α is large, and (B) shows a case where the winding angle α is small.
Figure 17:
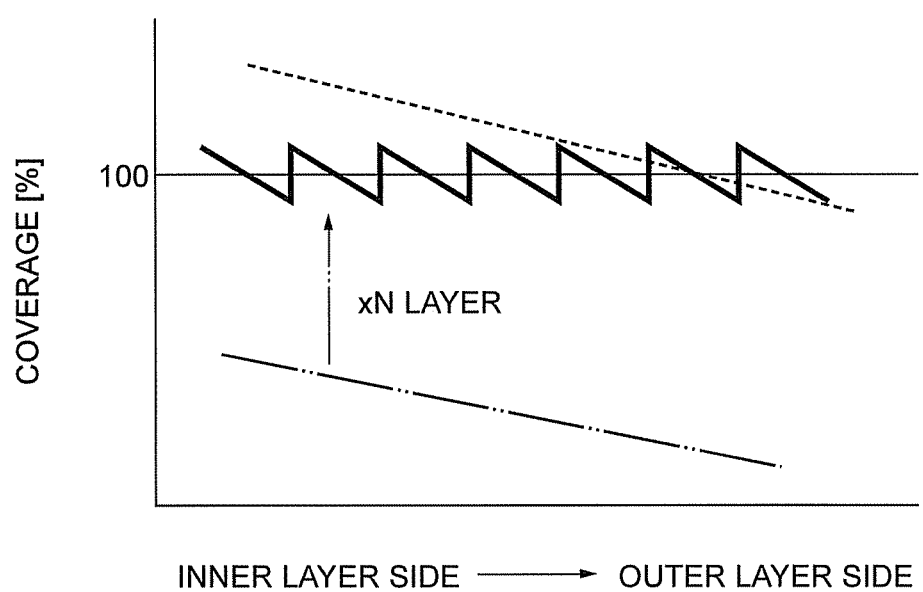
FIG. 17 is a graph showing a change of a coverage with the fibers in a case where the fibers are laminated from an inner layer side to an outer layer side of an FRP layer.

In the filament winding device 100 described above, the ring eye 130 is moved from one end side to the other end side of the liner 20 while rotating the liner (the wound member) 20, and the plurality of fibers 70 are not wound around the whole periphery but can be wound around one portion while being gathered (see FIG. 14). Moreover, when the ring eye 130 is returned to the one end side, the fibers 70 can similarly be wound around the liner 20 (the tank 1) while gathering the fibers 70 (see FIG. 15). In this case, the intersecting portions of the fibers 70 with each other concentrate substantially around the center of the liner 20 (the tank 1), and the number of the intersecting portions of the fibers 70 with each other decreases. Therefore, a conventional mesh pattern (see FIG. 18 and FIG. 19) is not formed but a smooth pattern formed by smoothly winding the fibers 70 (see FIG. 4 and FIG. 5) can be formed. In consequence, in the case of multiple-filaments feeding when the plurality of fibers are simultaneously fed, the FRP layer 21 can be prevented from becoming thick by avoiding the piled fibers.

Moreover, in general, a width of the fibers 70 in a peripheral direction changes in accordance with a size of a winding angle $\alpha$, but according to the filament winding device 100 of the present embodiment, the fibers 70 do not pile on each other but can be wound while being gathered, in accordance with such a change. That is, when the winding angle $\alpha$ is large, a width w of the fibers 70 in the peripheral direction also becomes large (see FIG. 16(A)). When the winding angle $\alpha$ is small, the width w of the fibers 70 in the peripheral direction also becomes small (see FIG. 16(B)). When the setting of the rotation speed of the liner 20 or the moving speed of the ring eye 130 is changed in accordance with the above-mentioned winding mechanism in the filament winding device 100 of the present embodiment, the fibers 70 can be wound by appropriately changing the winding angle $\alpha$ of the helical winding while preventing the fibers 70 from being piled on each other.

Therefore, the filament winding device 100 can realize a type of a helical winding pattern (a degree of freedom) in the same manner as in a monofilament equipment (a filament winding equipment which winds a single fiber). In addition, the device also has a multiple-filaments feeding advantage that a plurality of fibers can be wound simultaneously, quickly and as uniform as possible.

Figure 10:
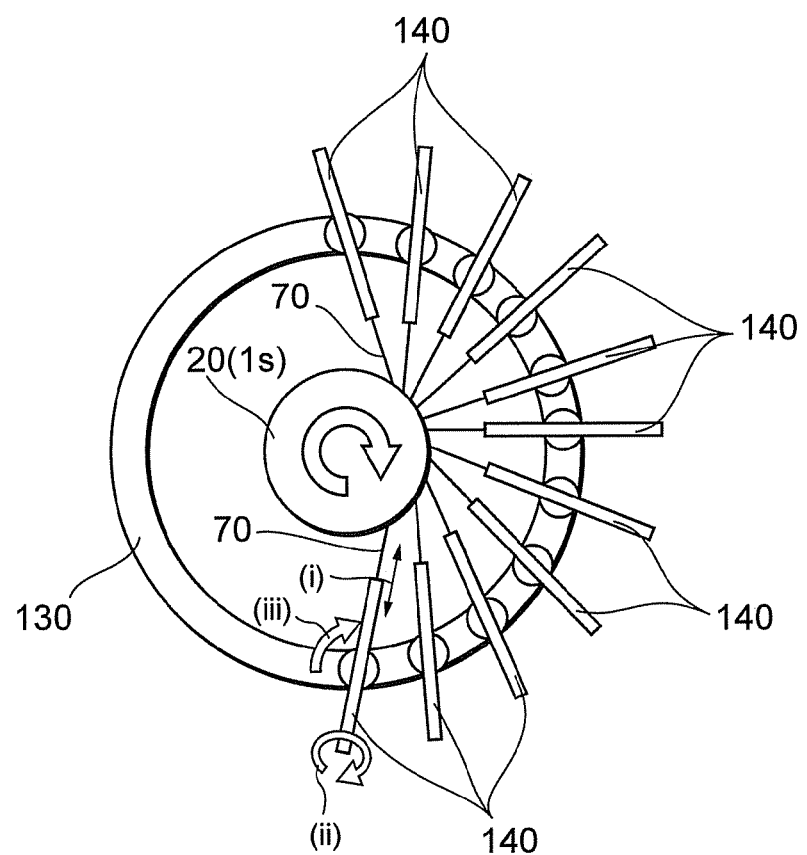
FIG. 10 is a view schematically showing the constitution of the ring eye and the eye ports in the embodiment of the present invention.

It is to be noted that in the present embodiment, there has been described illustration of an example in which the eye ports 140 are arranged in a part corresponding to a one-side semicircle of the ring eye 130 and having a center angle of about 180° (see FIG. 10 and FIG. 11). However, this is merely illustration, and the eye ports 140 may be arranged in a region having a center angle which is 180° or larger or is smaller than 180°. In short, there is not any special restriction on a breadth of an arrangement region as long as the fibers 70 can be gathered in the outer periphery of the outer periphery regardless of the size of the diameter of the liner (the wound member) 20. Moreover, there is not any special restriction on an arrangement interval of the eye ports 140 as long as the gathering of the fibers 70 in the outer periphery of the liner 20 is not influenced. For example, the interval is broadened or narrowed in accordance with the arrangement, and in this manner, the interval does not have to be uniform.

Moreover, a coverage of the liner 20 with the fibers 70 when the ring eye 130 is reciprocated in the axial direction of the liner 20 during the filament winding (a ratio of a region covered with the fibers 70 when the ring eye 130 is reciprocated once) is preferably set to be smaller than 50%. The fibers 70 which cover the periphery of the liner 20 are preferably wound without any excess/deficiency (in a state where the coverage is 100%). However, in general, when the helical layer 70H and the hoop layer are laminated, the coverage gradually decreases, as an outer diameter increases. Therefore, when the coverage is set to be around 100%, it is difficult to perform adjustment, even if the coverage lowers (see a broken line in FIG. 17). On the other hand, when the coverage is set to be smaller than 50% as described above (see a two-dots chain line in FIG. 17), it is possible to perform the regulation in accordance with the lowering of the coverage. For example, when the coverage is 50%, the ring eye 130 is reciprocated twice to wind two layers of the fibers 70, whereby the coverage can be set to 100%. Similarly, when the coverage lowers to 33%, the fibers 70 for three layers are wound. When the coverage lowers to 25%, the fibers 70 for four layers are wound. When the fibers 70 for N layers are wound in accordance with a numeric value of the coverage at this time in this manner, the coverage in the vicinity of 100% can be realized (see a solid line in FIG. 17).

Next, the fiber feeding portion 150 of the filament winding device 100 will be described. The fiber feeding portion 150 feeds the fibers 70 to the device main body portion 110 as described above, and in the present embodiment, the device is constituted of, for example, a plurality of fiber bobbins 151 and a creel stand 152 which supports the fiber bobbins 151 (see FIG. 6).

The fibers 70 fed to the device main body portion 110 are wound around each of the fiber bobbins 151. The fiber bobbins 151 are supported by each support shaft of the creel stand 152. Although not especially shown, the creel stand 152 is provided with means for imparting the tensile force to the fibers 70 fed from the respective fiber bobbins 151, for example, a brake unit, a load unit or the like. Moreover, a guide such as a pulley, or a tensile force measurement unit or the like is provided as required, halfway in a path through which the fibers 70 are fed to the device main body portion 110.

Here, in the present embodiment, the creel stand 152 is installed only on one side of the ring eye 130. The creel stand 152 including a large number of fiber bobbins 151 is large-scaled, and a pair of creel stands 152 are arranged on both sides of the ring eye 130 to occupy a large width, whereby the enlargement of the whole device is easily caused. Moreover, if all the creel stands 152 are arranged only on one side of the ring eye 130, there is usually required a large-scaled equipment in which the half of the fibers 70 are passed through a ceiling to be fed from one side to the other side of the device main body portion 110, or the like. In this respect, in the filament winding device 100 of the present embodiment in which the eye ports are provided only on about one half of the ring eye 130, the fibers 70 are sufficiently fed from the one side of the ring eye 130. Therefore, in the present embodiment, the creel stands 152 are installed only on one side of the ring eye 130, whereby the whole filament winding device 100 can be miniaturized (see FIG. 6).

Figure 4:
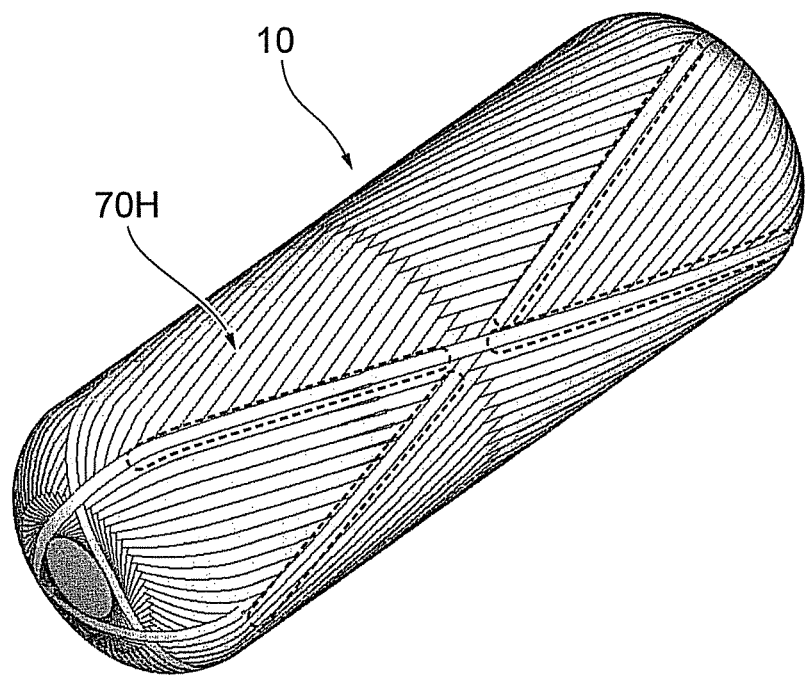
FIG. 4 is a perspective view showing an example of helical winding in a smooth helical layer.
Figure 5:
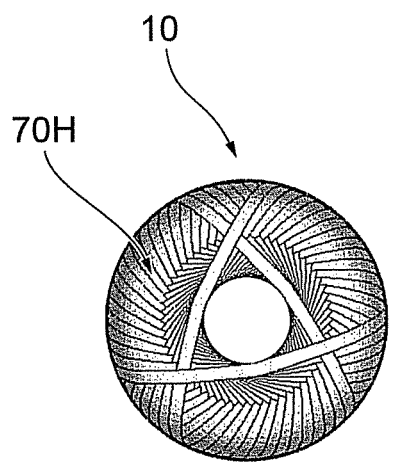
FIG. 5 is a projected view along a tank axial direction, showing the example of the helical winding in the smooth helical layer.

According to the above-mentioned helical winding formed by using the filament winding device 100, the fibers 70 can regularly be wound around the liner 20, unevenness due to the piling of the fibers 70 on each other is decreased or can be eliminated (see FIG. 4 and FIG. 5). In consequence, the smooth helical layer 70H having a smooth surface and having less unevenness can be formed. Therefore, the unevenness is prevented from being transferred to the hoop layer adjacent to the outside of the smooth helical layer 70H. In consequence, structural bends (undulations) of the fibers 70 which might occur in the hoop layer are decreased, and a strength development ratio can be prevented from lowering. When the structural bends (undulations) of the fibers 70 of the hoop layer are suppressed in this manner, a fatigue strength of the fibers 70 themselves can be enhanced. Moreover, when the hoop layer is formed to be thin and provided with a high Vf (a fiber volume content ratio), a burst strength of the tank 1 enhances. Needless to say, a space between the fibers 70 in the smooth helical layer 70H is small according to the helical winding of the present embodiment, and a thickness per layer becomes small. Furthermore, when the helical layer 70H is formed as such a smooth helical layer, thin layers are formed. Therefore, the hoop layer is positioned on an inner side of the tank 1 where the hoop layer more easily exerts a strength. In consequence, the hoop layer can be formed to be thin.

Moreover, in general, a bend stress due to a shape of the dome part 1$d$ is exerted on the dome part of the tank (a pressure container) 1, and such a bend stress becomes a decisive factor for so-called interlayer peeling in, for example, bending breakdown of the CFRP layer 21$c$. In this respect, according to the helical winding of the present embodiment, the space between the fibers 70 is decreased in not only the straight part 1$s$ but also the dome part 1$d$, whereby voids can be decreased. Therefore, when the voids are decreased in this manner, a suppressing effect of the interlayer peeling can be expected. Moreover, it can be expected that a burst/cycle strength of the dome part 1$d$ (a burst withstanding pressure or a durability against a plurality of use times) enhances.

Moreover, when the voids decrease as described above, an amount of air which is a cause for foaming decreases. When the FRP layer 21 thermally hardens, a foaming phenomenon might occur where the air appears as bubbles in a surface layer, but an advantage that the foaming can be suppressed is obtained when the voids can be decreased.

Furthermore, when the smooth helical layer 70H is formed, the unevenness in the outermost surface of the tank 1 eventually decreases. In consequence, it is possible to obtain an advantage that the outer diameter of the tank 1 is more stabilized and the fluctuations of the tank 1 are decreased. In particular, when the helical layer 70H of the outermost layer is formed as the smooth helical layer, it can be expected that the fluctuation of the outer diameter can more effectively be decreased.

Moreover, when not only the smooth helical layer 70H itself but also the hoop layer adjacent to this helical layer are provided with the high Vf, a resin, accordingly, less accumulates, whereby an amount of the resin to be used in the FRP layer 21 decreases. When the amount of the resin decreases in this manner, the tank 1 can be lightened more.

Furthermore, when the FRP layer 21 is provided with the high Vf and the amount of the resin decreases as described above, an amount of hardening heat to be generated (the heat generated by reactive heat during the thermal hardening of the resin) decreases. In general, when a peak temperature during the thermal hardening is high, a problem such as bonding (the liner 20 and the FRP layer 21 are partially or entirely bonded after the FW forming and the resin hardening) or liner material deterioration might occur. However, in the tank 1 of the present embodiment in which the amount of the hardening heat to be generated can be decreased in this manner, such a problem can be suppressed.

Figure 18:
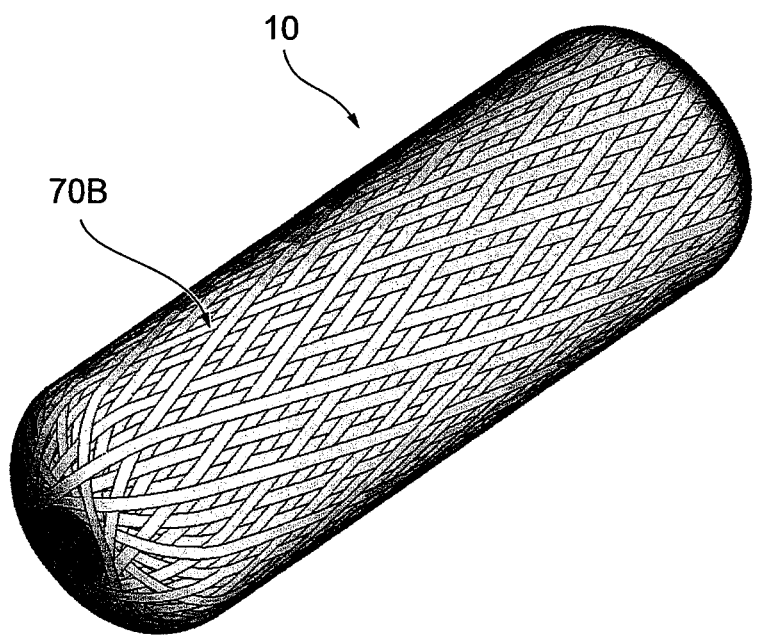
FIG. 18 is a perspective view showing an example of conventional helical winding as a reference.
Figure 19:
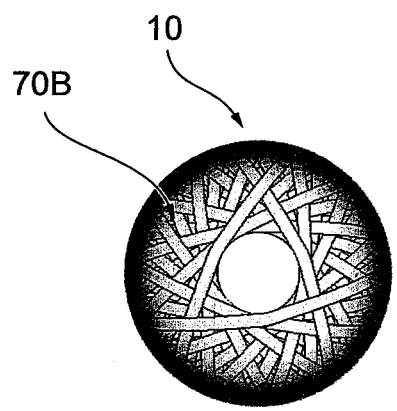
FIG. 19 is a projected view along a tank axial direction, showing the example of the conventional helical winding as the reference.
Figure 20:
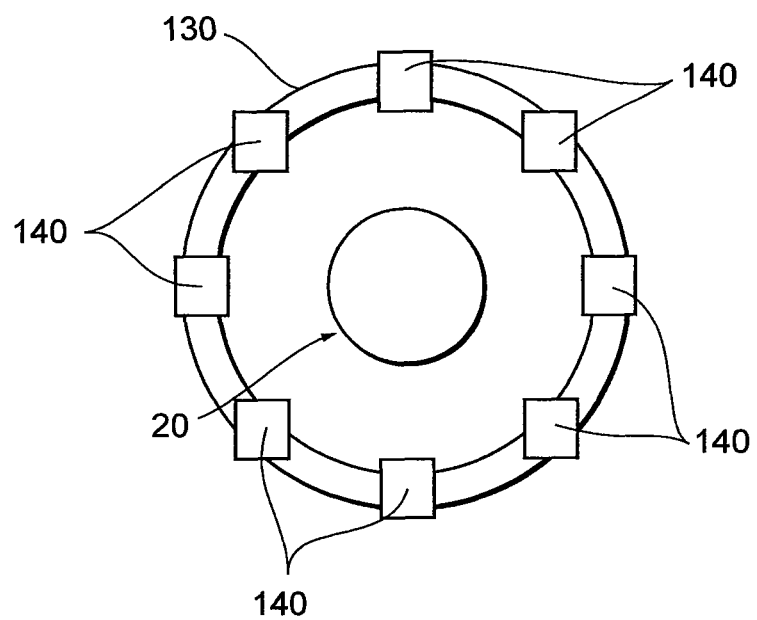
FIG. 20 is a view showing, as a reference, a concept of a constitution of a conventional ring eye and eye ports.
Figure 21:
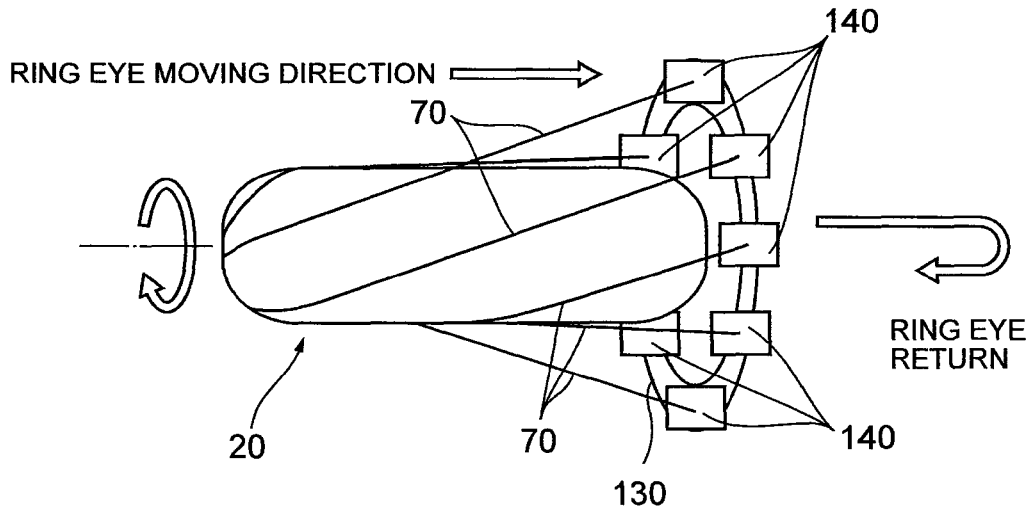
FIG. 21 is a view showing, as a reference, a conventional behavior in a case where a ring eye is moved to wind fibers around a liner.
Figure 22:
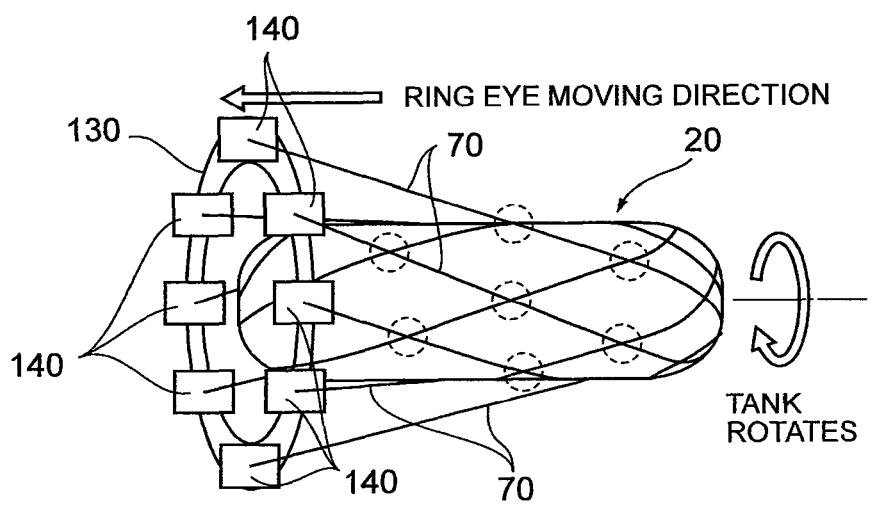
FIG. 22 is a view showing, as a reference, a behavior in a case where the ring eye is moved backwards and the fibers are wound around the liner.

Moreover, when the fibers 70 are regularly wound around the liner 20 as in the above-mentioned embodiment, a certain constantly regular pattern can be recognized in accordance with the winding way, unlike the conventional helical winding (see FIG. 18 and FIG. 19). That is, a substantially triangular unit pattern (a twill pattern) is formed by the fibers 70 arranged side by side. Moreover, there is formed a smooth surface having a configuration in which a plurality of unit patterns are regularly combined (see FIG. 4). Furthermore, adjacent unit patterns have different winding directions of the fibers 70, and hence a boundary portion between the unit patterns is easily visually recognized (see portions surrounded with broken lines in FIG. 4). As shown in FIG. 4, these boundary portions appear in an X-shape.

It is to be noted that the above embodiment is one preferable example of the present invention, but the present invention is not limited to this example, and can variously be modified without departing from the scope of the present invention. For example, in the above embodiment, there has been illustrated a case where the ring eye 130 and the hoop winding head 120 are moved with respect to the liner (the wound member) 20, but in short, the helical layer 70H or the hoop layer can be formed as long as the ring eye 130 and the hoop winding head 120 are moved relatively with respect to the liner (the wound member) 20.

Moreover, in the present embodiment, there has been illustrated a case where the wound member is the liner 20, but needless to say, the present invention can be applied to a case where the fibers 70 are wound around a mandrel.

Furthermore, in the above embodiments, there has been described the illustration of a case where the present invention is applied to a hydrogen tank which can be utilized in a fuel cell system or the like, but needless to say, the present invention can be applied to a tank to be filled with a fluid other than a hydrogen gas.

INDUSTRIAL APPLICABILITY

The present invention is preferably applied to a tank (a high-pressure container) having an FRP layer, and the like.

DESCRIPTION OF REFERENCE NUMERALS

20 . . . liner (wound member), 70 . . . fiber, 70H . . . helical layer, 100 . . . filament winding device, 130 . . . ring eye (fiber guide member), 140 . . . eye port (fiber feeding port), and 152 . . . creel stand.

The invention claimed is:

1. A filament winding device which moves a fiber guide member equipped with a plurality of fiber feeding ports relatively in an axial direction of a wound member rotating relatively about the axis, and feeds fibers through the fiber feeding ports to wind the fibers around the wound member,
    wherein the fiber feeding ports are provided only in part of the fiber guide member, and
    when the fiber guide member reciprocates relatively in the axial direction of the wound member, the fibers form a smooth helical layer.

2. The filament winding device according to claim 1, wherein the fiber feeding ports are provided so that a fiber feeding angle of the fibers is variable.

3. The filament winding device according to claim 2, wherein the fiber feeding ports are revolvable on the fiber guide member.

4. The filament winding device according to claim 3, wherein the fiber feeding ports operate in such a direction that the plurality of fibers are gathered in one portion on the wound member.

5. The filament winding device according to claim 1, wherein the fiber feeding ports are slidable to change a fiber feeding position of the fibers.

6. The filament winding device according to claim 1, wherein the fiber feeding ports are expandable/contractible generally towards or away from the wound member to change a fiber feeding position of the fibers.

7. The filament winding device according to claim 1, wherein a coverage of the wound member with the fibers (when the fiber guide member is reciprocated relatively in the axial direction of the wound member) is smaller than 50%.

8. The filament winding device according to claim 1, wherein a creel stand which receives the fibers is disposed only on one side of the fiber guide member.

9. A filament winding method comprising the steps of: moving a fiber guide member equipped with a plurality of fiber feeding ports relatively in an axial direction of a wound member rotating relatively about the axis; and feeding fibers through the fiber feeding ports to wind the fibers around the wound member,
    wherein the step of moving the fiber guide member relatively in the axial direction of the wound member feeds a plurality of fibers only from one side when viewed from the wound member, and winds the fibers around the wound member while the fibers are gathered on the periphery of the wound member.

* * * * *